Sept. 11, 1945.  E. LAXO  2,384,556
APPARATUS FOR TINNING THE EDGES OF CAN BODY BLANKS
Filed June 19, 1944  2 Sheets-Sheet 1
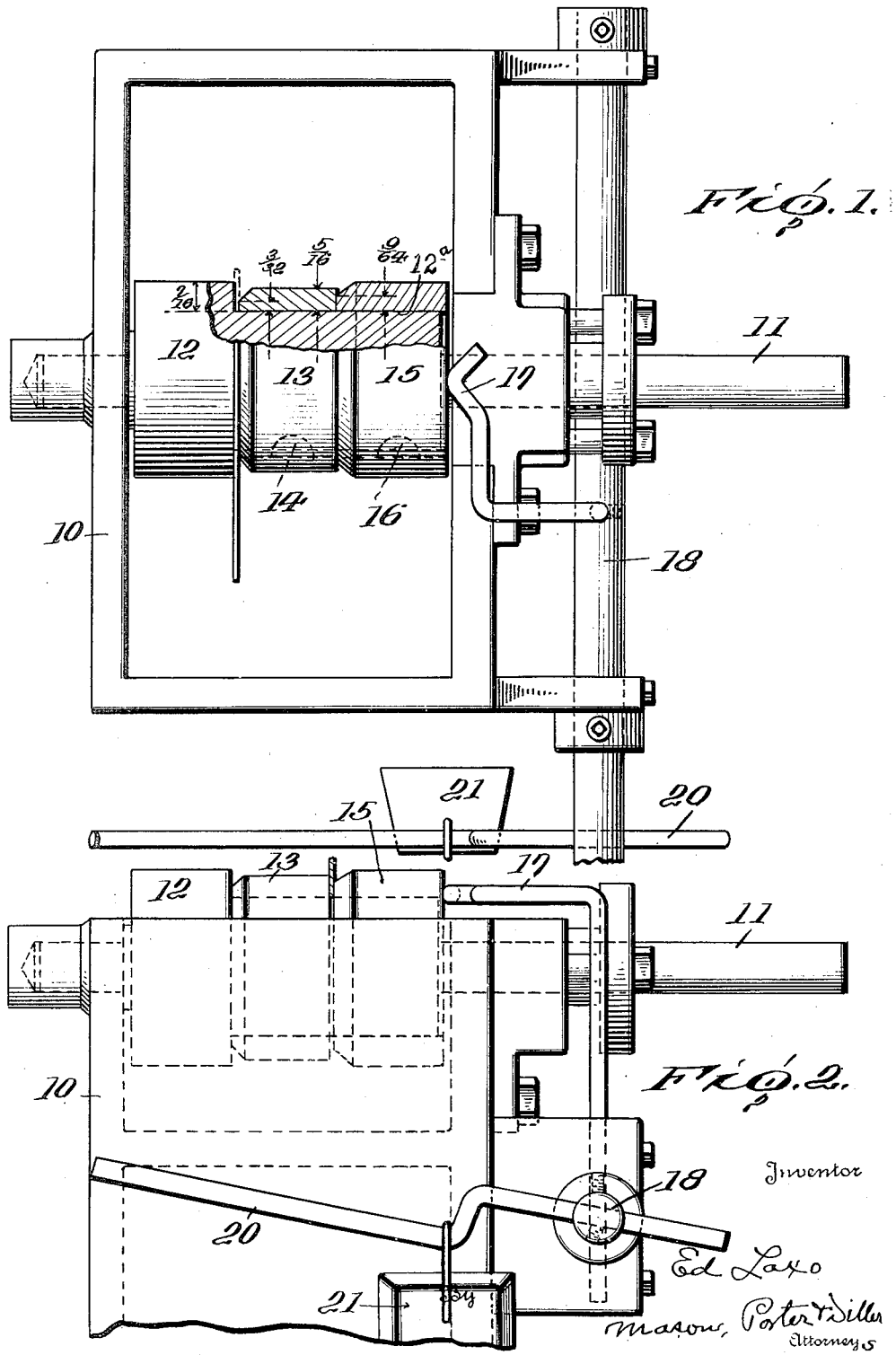

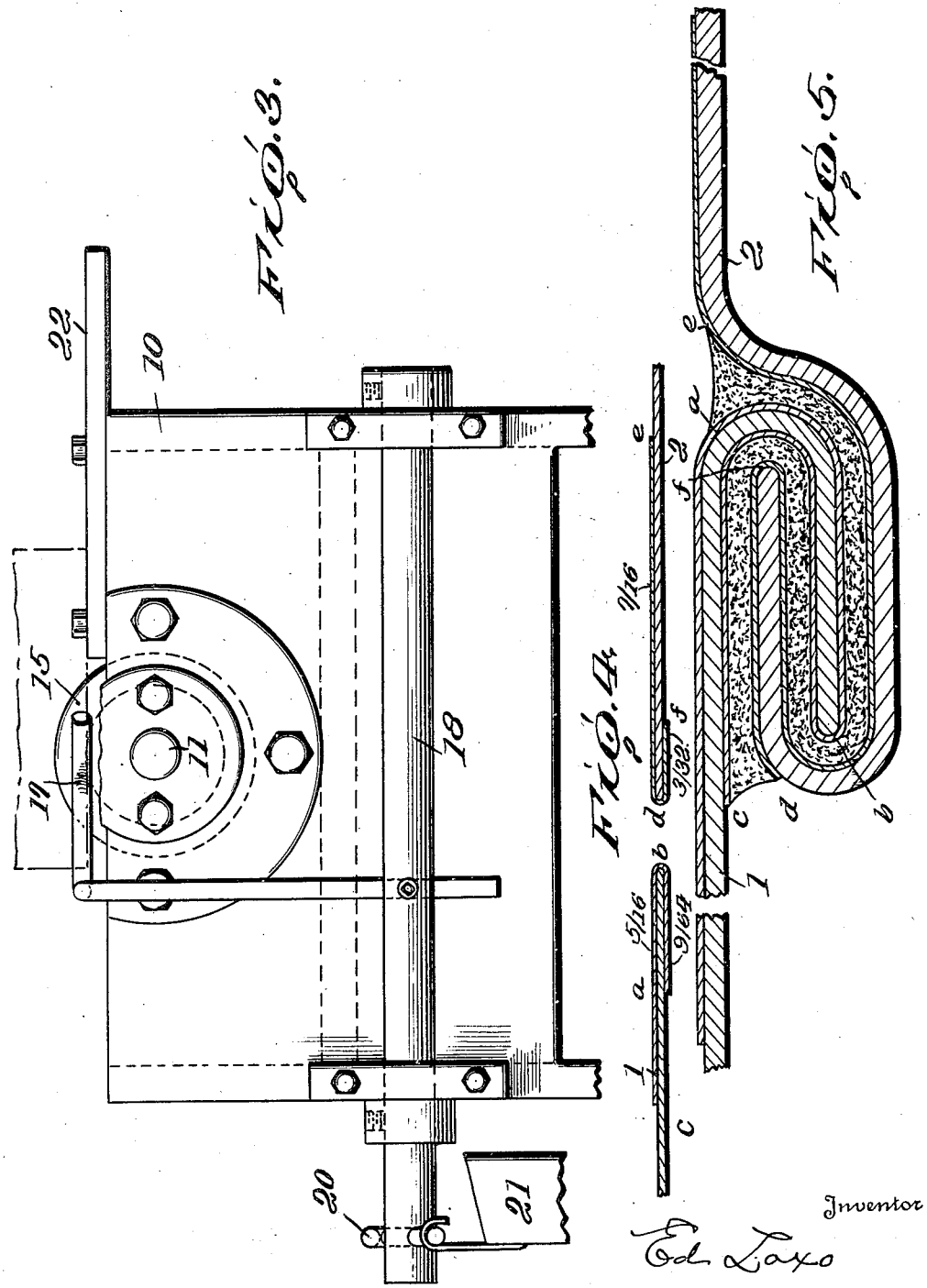

Patented Sept. 11, 1945

2,384,556

UNITED STATES PATENT OFFICE 2,384,556

APPARATUS FOR TINNING THE EDGES OF CAN BODY BLANKS

Ed Laxo, Riverside, Ill., assignor to Continental Can Company, Inc., New York, N. Y., a corporation of New York Application June 19, 1944, Serial No. 541,088

8 Claims. (Cl. 91—12.2)

The invention relates to new and useful improvements in an apparatus for tinning the edge portions of a black iron blank which is to be formed into a can body and the edge portions joined by solder bonding.

An object of the invention is to provide an apparatus for simultaneously tinning both faces of the edge portions of a black iron body blank.

A further object of the invention is to provide a tinning apparatus of the above type wherein one face is tinned to a different extent from the other.

These and other objects will in part be obvious and will in part be hereinafter more fully described.

In the drawings which show by way of illustration one embodiment of the invention:

Figure 1 is a view partly in plan and partly in section showing an apparatus embodying the improvements, the blank supporting plate being omitted for purposes of clarity.

Figure 2 is an end elevation of the apparatus shown in Fig. 1.

Figure 3 is a side view of the apparatus showing a portion of a body blank being presented to the coating rolls.

Figure 4 is a view showing more or less diagrammatically the edge portions of a body blank which are to be united to form the side seam and the extent to which the edge portions are tinned.

Figure 5 is also a diagrammatic view showing the edge portions of the body blank formed with hooks and the hooks interlocked.

Before describing the apparatus for coating or tinning the edge portions of the black iron body blank, brief description will be given of the side seam which is to be formed and the surfaces which are to be tinned. In Fig. 4 of the drawings, the end portions of a black iron body blank are illustrated diagrammatically on an enlarged scale. One of the end portions is designated 1 and the other is designated 2. It is understood that the body blank is a single piece and is curved into cylindrical or other form, bringing the edge portions togethher so that they may be united in a side seam, and in this Fig. 4, the edge portions are brought close together for the purpose of illustration and comparison. In Fig. 5, the edge portions have been formed with hooks. The edge portion 1 is bent downwardly and outwardly to form what is referred to as the outer hook, and the edge portion 2 is shown as bent outwardly and backwardly upon itself to form the inner hook. The metal of the edge portion 2 in a completed seam is also bent so as to place the interlocked portions of the seam on the inside of the container body.

In the applying of solder to the side seam of a black iron can body, it is essential that the portions which are to form the hooks shall be tinned on both surfaces thereof and also that the can body shall be tinned for a short distance at each side of the seam; that is, where the metal parts are turned inwardly to form the side seam. When the black iron plate is tinned at both sides of the entrance to the side seam, then the molten solder will adhere to the face of the can body and will sweat into the side seam, thus bonding the seam. In order to coat or tin the necessary parts of the edge portion 1 of the blank, the tin coating should be applied so as to extend from the point $a$ to the edge $b$ of the blank on the upper face as shown in Fig. 4, and it should extend from the point $c$ to the edge $b$ on the under face of the blank. In actual practice, the extent of coating on the upper face is approximately $\frac{1}{8}$ of an inch, and the extent of coating on the lower face is $\frac{9}{64}$ of an inch. While these dimensions have been applied to the drawings, the drawings are not to scale. As to the edge portion 2, it should be coated on the upper face from the point $e$ to the edge $f$, and it should be coated on the under face from the point $d$ to the edge $f$. In actual practice, the extent of coating on the upper face is approximately $\frac{7}{8}$ of an inch, and that on the under face is $\frac{3}{32}$ of an inch. When the blanks are coated to this extent, the hooks formed and interlocked and bumped to form a side seam, then all of the contacting faces will be tinned and the outer surface of the can body at each side of the entrance to the side seam also tinned (see Fig. 5). When the parts are tinned in the manner described above, then the can body, when presented to a solder applying roll, will receive the solder as it will adhere to the surface of the body, and it will be sweat into the side seam, thus completely filling the side seam and bonding the parts together.

The apparatus for coating the body blanks constitutes the invention in the present application. As shown in Fig. 1, the apparatus includes a tank 10 which is preferably rectangular in horizontal cross section. Mounted in suitable bearings in the side walls of the tank is a shaft 11. Said shaft has fixed thereto a roller 12. This roller 12 has an extended hub portion 12a. The roller and hub portion may be formed integral with the shaft. Mounted on this hub is a sleeve roller 13 which is free to move axially on the hub, but is secured to the hub by a key 14 so that it rotates with the hub. Also mounted on the hub is another roller 15 which is secured to the hub by a key 16. This roller turns with the hub, but is free to move axially thereon. An arm 17 is fixed to a shaft 18 and is bent upon itself to form a round shoulder 19 which bears against the side of the sleeve roller 15. The shaft 18 is provided with an arm 20 on which a weight 21 is adjustably mounted. This weight tends to turn the shaft 18 in a counterclockwise direction as viewed in Fig. 2, and this will press the round end of the arm 17 against the sleeve roller 15 and yieldingly press said sleeve roller 15 against the sleeve roller 13 and yieldingly move said sleeve roller 13 toward the roller 12 which is fixed to the shaft thereby to yieldingly hold said rollers in end contact with each other.

The tinning of the edge portions of the body blank is accomplished by applying thereto a molten alloy of tin and lead. The material forming the alloy is placed in the tank and is reduced to molten form by suitable heating means disposed within the tank or beneath the bottom wall of the tank. The level of the molten metal in the tank is maintained well above the lower faces of the roller 12 and the roller sleeves 13 and 15. Inasmuch as the lower portions of these rollers are immersed in the molten metal, the metal will adhere thereto and will coat the upper surfaces of the rollers. The blank to be coated is placed in a vertical position on a supporting plate 22 and is moved along said plate in between the adjacent faces of the roller 12 and the sleeve roller 13. The sleeve roller 13 will yield and move endwise along the hub 12a and allow the edge portion of the plate to pass between the adjacent faces of these rollers. The body blank as it passes between these rollers will rest on the hub 12a. Inasmuch as the rollers have a coating of metal adhering thereto on their adjacent faces, the blank will be coated and thus tinned to an extent depending upon the surface of the rolls contacting therewith. It is noted from Fig. 1 that the sleeve roller 13 is tapered at the end thereof adjacent the roller 12. The dimensions placed on the drawings are solely for the purpose of illustration. It will be noted that the width of the strip of tin placed on the body blank by the roller 12 is $\frac{1}{8}$ of an inch, while the width of the strip placed on the opposite side of the same blank is $\frac{3}{32}$ of an inch. After one edge portion of the body blank has been coated by passing it between the rollers 12 and 13, it is then inverted and the opposite end edge of the blank is passed between the rollers 13 and 15. Here, again, the blank rests on the feeding-in plate 22 and on the hub 12a of the roller 12. The sleeve roller 15 will move axially so as to permit the blank to pass between the adjacent faces of the rollers 13 and 15 as shown in Figs. 1 and 2 of the drawings, where the body blank is indicated at B. The width of the strip placed on one side of the blank as indicated will be $\frac{1}{8}$ of an inch, and the width of the strip on the other side of the blank will be $\frac{9}{64}$ of an inch. The edge portion shown at the right in Fig. 4 is coated by passing the same between the roller 12 and the sleeve roller 13, and the edge portion at the left in Fig. 4 is coated by passing the same between the sleeve rollers 13 and 15. The dimensions used in Fig. 1 have also been applied to Fig. 4, but again it may be stated that these dimensions are solely for the purpose of illustration, and in this Figure 4, the dimensions shown are not to scale, but greatly enlarged.

It will be apparent from the above that the body blank has been tinned with a minimum amount of tinning material so as to enable a seam to be formed joining the edge portions of the body blank which is efficiently solder bonded.

While the apparatus has been described in detail as applicable to the coating of black plate with metal, it will be understood that the apparatus may be used for coating with other materials, such, for example, as a thermoplastic adhesive or some other form of adhesive. In the forming of fiber containers, it is often desirable to coat the edge portions only of a blank for joining the same in a side seam or in an end seam. It will be understood, therefore, that many changes in the details of construction and the use of the apparatus may be made without departing from the spirit of the invention as set forth in the appended claims.

Having thus described the invention, what is claimed as new and desired to be secured by Letters Patent is:

1. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, yielding means for urging said sleeve roller toward said fixed roller, means for supporting a body blank as its edge portion is presented to the rollers so that said edge portion rests on said hub and the opposing end faces of the fixed roller and the sleeve roller contact with opposite faces of the edge portion of the blank.

2. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, yielding means for urging said sleeve roller toward said fixed roller, means for supporting a body blank as its edge portion is presented to the rollers so that said edge portion rests on said hub and the opposing end faces of the fixed roller and the sleeve roller contact with opposite faces of the edge portion of the blank, the outer diameter of said end face of the sleeve roller differing from the outer diameter of said end face of the fixed roller whereby the strips of material coated on opposite sides of the blank will be of different width.

3. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, yielding means for urging said sleeve roller toward said fixed roller, means for supporting a body blank as its edge portion is presented to the rollers so that said edge portion rests on said hub and the opposing end faces of the fixed roller and the sleeve roller contact with opposite faces of the edge portion of the blank, the outer diameter of said end face of the sleeve roller differing from the outer diameter of said end face of the fixed roller whereby the strips of material coated on opposite sides of the blank will be of different width, one said roller at the end thereof adjacent the other said roller being tapered away from the other said roller in the region beyond its said end face to facilitate the entrance of the blank between said rollers.

4. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, a second coating sleeve roller mounted on said hub and rotating therewith and movable axially of the hub into engagement with the first-named sleeve roller, and yielding means bearing on said second coating sleeve roller for urging said sleeve rollers in a direction toward the fixed roller, whereby a body blank may be selectively engaged between the fixed roller and the sleeve roller adjacent thereto or between said sleeve rollers, said blank resting on the hub with the end faces of the rollers contacting with the blank for coating the edge portions thereof.

5. In apparatus for coating the edge portions of a body blank comprising a tank for the coating material, a plurality of coating rollers having annular contacting end faces of different widths and mounted for endwise movement relative to each other for rotation about a common axis in said tank and disposed so as to dip into coating material placed in said tank, means for yieldingly holding the rollers in end contact with each other, and means for supporting a body blank as its edge portion is presented to said rollers in position for engaging between a selected pair of said rollers whereby the end faces of said selected rollers contacting with the edge portion of the blank will coat both sides thereof to an extent depending upon the width of the contacting faces of the selected pair of rollers.

6. An apparatus for coating the edge portions of a body blank comprising a tank for the coating material, at least two coating rollers having annular contacting end faces and mounted for rotation about a common axis in said tank and disposed so as to dip into coating material placed in said tank and with at least one thereof movable endwise relative to the adjacent roller, means for yieldingly holding the rollers in end contact with each other, and means for supporting a body blank as its edge portion is presented to said rollers in position for engaging between said rollers whereby the end faces of said rollers contacting with the edge portion of the blank will coat both sides thereof to the extent of the width of the annular contacting end faces of the rollers.

7. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, a second coating sleeve roller mounted on said hub and rotating therewith and movable axially of the hub into engagement with the first-named sleeve roller, and yielding means bearing on said second coating sleeve roller for urging said sleeve rollers in a direction toward the fixed roller, whereby a body blank may be selectively engaged between the fixed roller and the sleeve roller adjacent thereto or between said sleeve rollers, said blank resting on the hub with the end faces of the rollers contacting with the blank for coating the edge portions thereof, the end face of each roller opposing an end face of an adjacent roller being different in diameter from the diameter of the roller end face which it opposes.

8. An apparatus for coating the edge portions of a body blank comprising a tank for the coating material, a shaft mounted on said tank, a coating roller fixed to said shaft and having a hub extending laterally therefrom, a coating sleeve roller mounted on said hub for rotation therewith and for axial movement relative to the first-named roller, a second coating sleeve roller mounted on said hub and rotating therewith and movable axially of the hub into engagement with the first-named sleeve roller, and yielding means bearing on said second coating sleeve roller for urging said sleeve rollers in a direction toward the fixed roller, whereby a body blank may be selectively engaged between the fixed roller and the sleeve roller adjacent thereto or between said sleeve rollers, said blank resting on the hub with the end faces of the rollers contacting with the blank for coating the edge portions thereof, the end face of each roller opposing an end face of an adjacent roller being of a diameter distinct from the diameter of each of the roller end face opposing face of each of the other rollers and each of the sleeve rollers being tapered at the position of its roller opposing end face.

ED LAXO.